No. 650,270. Patented May 22, 1900.
J. PERRIN.
CULTIVATOR.
(Application filed Jan. 25, 1900.)

(No Model.)

Witnesses:
H. A. Daniels
Henry Orth Jr.

Inventor:
Joseph Perrin
By Thomas P. Simpson
Attorney

UNITED STATES PATENT OFFICE.

JOSEPH PERRIN, OF LORDSBURG, NORTH DAKOTA.

CULTIVATOR.

SPECIFICATION forming part of Letters Patent No. 650,270, dated May 22, 1900.

Application filed January 25, 1900. Serial No. 2,767. (No model.)

*To all whom it may concern:*

Be it known that I, JOSEPH PERRIN, a citizen of the United States, residing at Lordsburg, in the county of Bottineau and State of North Dakota, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates generally to cultivators for potatoes or for any plants which are grown in rows, and has for its special object to save time and expense in raising a crop.

Figure 1:
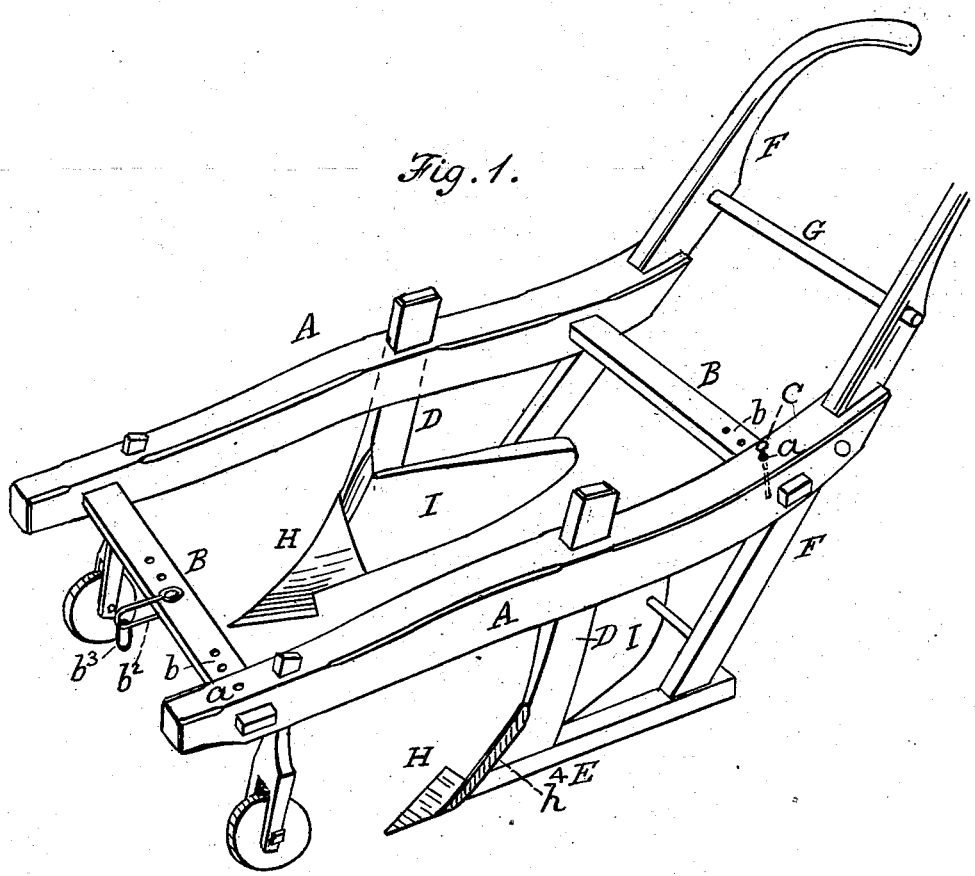
Figure 2:
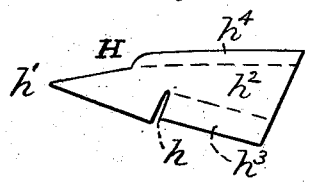
Figure 3:
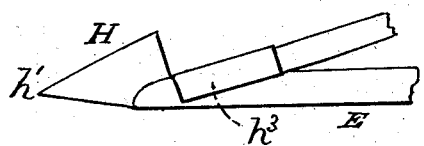

Figure 1 of the drawings is a perspective view of my double cultivator. Fig. 2 is a plan view of my cultivator blade or tooth shown in the form of a blank, the shape of flanges, their position, and that of the point being illustrated by the aid of dotted lines; and Fig. 3 is a bottom view of the tooth, shoe, and standard, showing how one flange turns under the shoe, while Fig. 1 shows how the other flange passes down the sides of the standard and shoe.

In the drawings, A A represent two parallel plow-beams connected by the two bars or spacers B B, which are at right angles thereto. The spacers B have near one end a series of holes $b$, which may be made to register with vertical holes $a$ in one of the plow-beams, so as to receive a pin or fastening C. This enables the plow-beams to be set at a greater or less distance apart to correspond with that between the rows of plants. $b'$ represents a series of holes in the front spacer, through which goes a pin which passes through opposite eyes of a yoke $b^2$, carrying the ring $b^3$. The draft may thus be adjusted.

D represents the plow-standards, forwardly inclined and supported at the bottom by the front of the shoe E, which also supports at the rear forwardly-inclined handles F, which may or may not be provided with a spacer-rod G.

H represents my peculiar plow-point, which is provided with the slit $h$, which marks the dividing-line between the point $h'$ and the shank $h^2$. The latter has a flange $h^3$, which goes under the shoe, while on the forward incline is a flange $h^4$, which passes down the side of both standard and shoe, the said shank being then screwed or bolted to the moldboard I, as well as to the standard and shoe. The moldboard I does not perform the function of a moldboard which turns a furrow, but merely presses the loose dirt to the middle of row, which a double-moldboard plow subsequently turns back to the plants. The plow-point H acts like the share of a subsoil-plow merely to cut under and crumble the soil, which is then pressed by both cultivators together in the middle of the row to form an elevation, which is afterward split by the double-moldboard plow.

What I claim as new is—

In cultivators, the plow-point H having point $h'$, shank $h^2$ and flanges $h^3$ $h^4$ combined as shown with standard D, shoe E and moldboard I, the flange $h^3$ being bent around the front end of the moldboard and shoe while the flange $h^4$ is bent around the side of standard and shoe, for the purpose set forth.

In testimony whereof I affix my signature in presence of two witnesses.

JOSEPH PERRIN.

Witnesses:
D. M. GILLUS,
BARRONIA PERRIN.